(12) United States Patent
Lee et al.

(10) Patent No.: US 8,329,313 B2
(45) Date of Patent: Dec. 11, 2012

(54) ELECTRICALLY CONDUCTIVE AND ANTI-CORROSIVE COATING, A METHOD FOR PREPARING THE SAME AND AN ARTICLE COATED WITH THE SAME

(75) Inventors: Young Chul Lee, Seoul (KR); Myeong Jun Kim, Cheonan-Si (KR); Mee Young Park, Cheongwon-Gun (KR)

(73) Assignee: Korea Institute of Industrial Technology (KR)

( * ) Notice: Subject to any disclaimer, the term of this patent is extended or adjusted under 35 U.S.C. 154(b) by 0 days.

(21) Appl. No.: 13/131,399

(22) PCT Filed: Dec. 23, 2008

(86) PCT No.: PCT/KR2008/007628
§ 371 (c)(1),
(2), (4) Date: May 26, 2011

(87) PCT Pub. No.: WO2010/062002
PCT Pub. Date: Jun. 3, 2010

(65) Prior Publication Data
US 2011/0236710 A1    Sep. 29, 2011

(30) Foreign Application Priority Data

Nov. 27, 2008   (KR) .................. 10-2008-0118663

(51) Int. Cl.
*B32B 15/04* (2006.01)
*B32B 15/08* (2006.01)
*B32B 15/18* (2006.01)
*B32B 27/18* (2006.01)
*B32B 27/20* (2006.01)
*H01B 1/20* (2006.01)
*H01B 1/22* (2006.01)
*H01B 1/24* (2006.01)

(52) U.S. Cl. ........ 428/626; 428/684; 428/659; 252/503; 106/14.05

(58) Field of Classification Search .................. 428/626, 428/681, 684, 659, 412, 413, 421, 423.1, 428/457, 461, 484.1, 489, 500, 524, 480
See application file for complete search history.

(56) References Cited

U.S. PATENT DOCUMENTS

| 2003/0124379 | A1* | 7/2003 | Reising et al. ................. 428/626 |
| 2007/0231579 | A1* | 10/2007 | Jones et al. ................... 428/413 |

FOREIGN PATENT DOCUMENTS

| JP | 2002-226775 A | 8/2002 |
| JP | 2002-322415 A | 11/2002 |
| KR | 10-1998-0701019 A | 4/1998 |
| KR | 10-2005-0117333 A | 12/2005 |
| KR | 10-2006-0106666 A | 10/2006 |
| KR | 10-2007-0050709 A | 5/2007 |
| KR | 10-0804934 B1 | 2/2008 |
| WO | WO 2007/055498 | * 5/2007 |

OTHER PUBLICATIONS

Machine Translation, Cho et al., KR 10-0804934, Feb. 2008.*
Machine Translation, Lee et al., KR 10-2007-0050709, May 2007.*
International Search Report dated Jul. 30, 2009 of PCT/KR2008/007628 (3 pages).
Written Opinion dated Jul. 30, 2009 of PCT/KR2008/007628 (3 pages).
Office Action dated Aug. 30, 2010 from the Korean Patent Office in the counterpart Korean Patent Application No. 10-2008-0132540 (5 pages).
Notice of Allowance dated Oct. 28, 2011 of corresponding Korean Patent Application No. 10-2008-0132540—4 pages.

* cited by examiner

*Primary Examiner* — Michael La Villa
(74) *Attorney, Agent, or Firm* — Knobbe Martens Olson & Bear, LLP.

(57) ABSTRACT

The present invention relates to a coating composition having excellent electro-conductivity and corrosion resistance, a method of preparing the coating composition, and an article coated with the coating composition. More particularly, the present invention relates to a coating composition having excellent surface electro-conductivity and corrosion resistance, comprising: one or more base resins selected from the group consisting of a polyester resin, an epoxy resin, a polyurethane resin, an acrylic resin, a polyolefin resin, a fluorine resin, a polycarbonate resin and a phenol resin; a melamine-based curing agent; one or more selected from among carbon black and carbon nanotubes; metal powder; and organo clay, a method of preparing the coating composition, and an article coated with the coating composition.

7 Claims, No Drawings

ELECTRICALLY CONDUCTIVE AND ANTI-CORROSIVE COATING, A METHOD FOR PREPARING THE SAME AND AN ARTICLE COATED WITH THE SAME

TECHNICAL FIELD

The present invention relates to a coating composition having excellent electro-conductivity and corrosion resistance, a method of preparing the coating composition, and an article coated with the coating composition. More particularly, the present invention relates to a coating composition having excellent surface electro-conductivity and corrosion resistance, comprising: one or more base resins selected from the group consisting of a polyester resin, an epoxy resin, a polyurethane resin, an acrylic resin, a polyolefin resin, a fluorine resin, a polycarbonate resin and a phenol resin; a melamine-based curing agent; one or more selected from among carbon black and carbon nanotubes; metal powder; and organo clay, a method of preparing the coating composition, and an article coated with the coating composition.

BACKGROUND ART

Generally, polymer materials are widely used in space-aviation industries, automobile industries, construction industries and household appliance industries and the like because they have high strength and hardness, excellent durability and formability in spite of low density and weight. With the advancement of industry, demands for the polymer materials are increasing, and thus conventional industrial materials are being replaced by the polymer materials. Since a polymer is a typical insulator, research into a polymer composite material having excellent electro-conductivity is being made in various directions.

An electro-conductive polymer composite material, which is formed by adding an electro-conductive filler to a polymer resin, is a highly-functional material which can replace metals because it is lighter and more flexible than them. Further, the electro-conductive polymer composite material is frequently used as a thermal interface material (TIM) requiring low electric resistance and dielectric constant because its formation of thermal and electrical conductive networks is feasible and material properties can be easily adjusted according to the shape and amount of a filler.

Electromagnetic radiation comes from natural or artificial sources. The natural sources include lightning, sunspots, auroras and the like, and the artificial sources include all digital electronic equipment including integrated circuits, microprocessors, timers and the like. That is, electromagnetic radiation is caused by an induced current formed on a conductor. Electronic parts malfunction because they confuse this induced current with a normal current, and such a phenomenon is called electromagnetic interference (EMI). EMI shielding reduce the electromagnetic interference (EMI) by reflecting or absorbing electromagnetic waves by using electronic parts made of conductive materials or coating the electronic parts with the conductive materials. A coating process for shielding the electromagnetic interference (EMI) can be used for coating whole equipments, electronic circuits and devices, respectively. An electrostatic dissipation (ESD) coating process is well known to be used to treat electronic parts. For example, the electrostatic dissipation (ESD) coating process is applied to a disk drive head. This disk drive head depends on giant megnetoresistive effect (GMR), and is configured to be easily broken by electrostatic sparks. As the speed of a disk drive increases, electrostatic dissipation (ESD) is more strongly required. In the electrostatic dissipation (ESD) coating process, an electro-conductive additive must be sufficiently dissipated, exact conductivity must be realized, and sloughing must not occur. The electrostatic dissipation (ESD) coating process is frequently used even in the field of packaging. It is quite possible for an ESD market in which carbon nanotubes are used as an electro-conductive additive to be enlarged according to the expansion of the disk drive market. In particular, as computers miniaturize, it is expected that the ESD market will become larger.

A steel sheet which is surface-treated with a polymer coating material is frequently used as a structural member, such as a electronic equipment, a household appliance, a case of an OA device, sash, frame and the like. Hence, Japanese steel manufacturers are developing a coating agent for a steel sheet, including a conductive additive and a heat-dissipative additive. However, when a heat-dissipative additive, such as carbon black, and a conductive additive, such as metal powder, which are currently used mainly, are dispersed in a polymer coating resin, the corrosion resistance of the steel sheet becomes poor. Therefore, it is a very important task to impart corrosion resistance to a steel sheet.

Recently, as electronic appliances are more highly-functionalized and miniaturized, the internal temperature of the electronic appliance is increased by the heat generated therein, so that devices installed therein, such as ICs, CPUs, components and the like, may break down, and the lifespan of the electronic appliance may be decreased. Therefore, in the electronics industry, it is very imminent to discharge heat to the outside of the electronic appliance. In particular, carbon black, carbon nanotubes (CNTs), and the like can be used to increase both the electrical conductivity and thermal conductivity of a polymer, and thus it is very important to systematically research such materials.

Further, the interest in electrostatic dissipation materials is increasing because there is a possibility of a monitoring chip exploding and a danger of the monitoring chip being damaged by electricity. Since a coating agent having an electrostatic dissipation function can solve such problems, it is expected that such a coating agent will play an important role in the automobile market in the future.

Carbon black, which is generally used to prepare a coating agent, is advantageous from the economical point of view, but is disadvantageous in that it is difficult to control the conductivity of a coating agent. Meanwhile, when a coating agent needs to be strongly conductive, carbon-steel fibers are used, and when the coating agent needs to be effectively conductive, metallicized particles are used effectively. However, there is a disadvantage in that the carbon-steel fibers or metallicized particles are expensive.

It is known that when migrating antistatic agents or polymers are used to prepare a coating agent, the coating agent has a surface electric resistance of 1012~1014 ohms/square and is thus used for insulation, and that when inherently conductive polymers (ICPs) or inherently dissipative polymers (IDPs) are used to prepare a coating agent, the coating agent has a surface electric resistance of 104~1010 ohms/square and is thus used for dissipation, and that when carbon black-based compounds are used to prepare a coating agent, the coating agent has a surface electric resistance of 102~104 ohms/square and is thus used for conduction, and that when electromagnetic interference compounds or metals are used to prepare a coating agent, the coating agent has a surface electric resistance of 101~10-6 ohms/square and is thus used for high conduction.

Referring to documents related to conventional coating agents, Korean Patent Registration No. 10-0764340 discloses a heat-dissipative coating agent which is applied on one or both sides of a metal substrate to form a coating layer and thus can be applied to information storage and display devices, such as compact discs (CDs), laser discs (LDs), digital versatile discs (DVDs), compact disc-read only memory (CD-ROM), compact disc-random access memory (CD-RAM), plasma display panels (PDPs), liquid crystal displays (LCDs) and the like. The heat-dissipative coating agent includes a polyester resin as a binder. When the metal substrate coated with the heat-dissipative coating agent is heated to a temperature of 100° C., the integral emissivity of infrared rays (wavelength: 4.5~5.4 um) is 0.6 or more. Further, 15~50% of metal powder, such as nickel (Ni) powder and the like, is added to this coating agent to reduce the electric resistance of the coating agent to a level of 10~100 Ω/square, thus imparting electromagnetic wave shielding properties to the coating agent. However, in this patent document, the corrosion resistance of a coating agent is not described at all.

Currently, in most Korean patents related to the practical application to CRT coating, antistatic coating, active matrix liquid crystal display component coating or the like using a conductive polymer such as polyethylene dioxythiophene (PEDT), polyaniline or the like, which has electro-conductivity without the aid of additives. In this case, surface electric resistance was mostly measured within the range of 100~1000 Ω/square.

It is known that conductive coating agents including conductive particles are being studied by paint companies. Examples of the conductive particles may include metal particles such as aluminum particles, zinc particles and the like, carbon black particles, carbon nanotube particles, and the like.

The present inventor developed a method of preparing a nanocomposite material by dissipating an inorganic plate-like compound in a thermosetting resin and then exfoliating the dissipated compound, and produced a nanocomposite coating agent having excellent shielding ability and corrosion resistance using the method (Korean Patent Registration No. 10-0604984). Specifically, this method is a method of preparing an anticorrosive coating agent using nanosize-dispersed plate-like clay (MMT) instead of alumina sol used to prepare a conventional coating agent prepared by adding a cross-linking agent and an anticorrosive agent such as alumina sol to a water-dispersible polymer.

Further, the present inventor developed a nanocomposite coating agent having improved corrosion resistance by adding a monomer or polymer including organic nanosize-dispersed plate-like clay (MMT) and a curing agent to a conventional anticorrosive coating agent prepared by adding other additives to main components including a monomer for an organic solvent, a polymer having reaction groups and a curing agent (Korean Patent Registration No. 10-0872833).

However, a coating agent for a steel sheet, having both conductivity and corrosion resistance, has not yet been disclosed.

Therefore, in consideration of the above problems, the present inventor has attempted to prepare a coating composition for a steel sheet, which can exhibit both conductivity and corrosion resistance. As a result, the present inventor prepared a coating composition having excellent electro-conductivity and corrosion resistance by mixing organo clay, metal powder and carbon black with a base resin and a melamine-based curing agent using ultrasonic waves to form a mixture, uniformly dispersing the mixture and then adding other additives to the dispersed mixture. Thus, the present invention was completed.

DISCLOSURE

Technical Problem

Accordingly, the present invention has been made keeping in mind the above problems occurring in the prior art, and an object of the present invention is to provide a coating composition, having excellent electro-conductivity and corrosion resistance, prepared by mixing organo clay, metal powder and carbon black with a base resin and a melamine-based curing agent.

Another object of the present invention is to provide a method of preparing a coating composition having excellent electro-conductivity and corrosion resistance by mixing organo clay, metal powder and carbon black with a base resin and a melamine-based curing agent using ultrasonic waves.

A further object of the present invention is to provide an article coated with the coating composition having excellent electro-conductivity and corrosion resistance.

Technical Solution

An aspect of the present invention provides a coating composition having excellent electro-conductivity and corrosion resistance, including: one or more base resins selected from the group consisting of a polyester resin, an epoxy resin, a polyurethane resin, an acrylic resin, a polyolefin resin, a fluorine resin, a polycarbonate resin and a phenol resin; a melamine-based curing agent; one or more selected from among carbon black and carbon nanotubes; metal powder; and organo clay.

Another aspect of the present invention provides a method of preparing a coating composition having excellent electro-conductivity and corrosion resistance, including the step of: uniformly dispersing using ultrasonic waves one or more base resins selected from the group consisting of a polyester resin, an epoxy resin, a polyurethane resin, an acrylic resin, a polyolefin resin, a fluorine resin, a polycarbonate resin and a phenol resin; a melamine-based curing agent; one or more selected from among carbon black and carbon nanotubes; metal powder; and organo clay.

A further aspect of the present invention provides an article having excellent electro-conductivity and corrosion resistance coated with the coating composition.

Advantageous Effects

The coating composition of the present invention, which is prepared by mixing organo clay, metal powder and carbon black with a resin composition using ultrasonic waves, can exhibit excellent electro-conductivity and corrosion resistance. Further, the coating composition of the present invention can be used to produce an article having improved electro-conductivity and corrosion resistance because it can be advantageously applied on the surface of other metals or materials as well as a zinc-plated steel sheet.

BEST MODE

Hereinafter, the present invention will be described in detail.

The present invention provides a coating composition having excellent electro-conductivity and corrosion resistance, including: one or more base resins selected from the group consisting of a polyester resin, an epoxy resin, a polyurethane resin, an acrylic resin, a polyolefin resin, a fluorine resin, a polycarbonate resin and a phenol resin; a melamine-based curing agent; one or more selected from among carbon black and carbon nanotubes; metal powder; and organo clay.

That is, the present invention provides a coating composition having both electro-conductivity and corrosion resistance, and the coating composition is prepared by mixing one or more selected from among carbon black and carbon nanotubes, metal powder and organo clay with a base resin and a melamine-based curing agent.

Preferably, the coating composition of the present invention includes: 100 parts by weight of one or more base resins selected from the group consisting of a polyester resin, an epoxy resin, a polyurethane resin, an acrylic resin, a polyolefin resin, a fluorine resin, a polycarbonate resin and a phenol resin; 1~20 parts by weight of a melamine-based curing agent; 1~20 parts by weight of one or more selected from among carbon black and carbon nanotubes; 1~40 parts by weight of metal powder; and 0.001~20 parts by weight of organo clay.

More preferably, the coating composition of the present invention includes: 100 parts by weight of one or more base resins selected from the group consisting of a polyester resin, an epoxy resin, a polyurethane resin, an acrylic resin, a polyolefin resin, a fluorine resin, a polycarbonate resin and a phenol resin; 1~20 parts by weight of a melamine-based curing agent; 1~10 parts by weight of one or more selected from among carbon black and carbon nanotubes; 1~20 parts by weight of metal powder; and 0.001~10 parts by weight of organo clay.

Still more preferably, the coating composition of the present invention includes: 100 parts by weight of one or more base resins selected from the group consisting of a polyester resin, an epoxy resin, a polyurethane resin, an acrylic resin, a polyolefin resin, a fluorine resin, a polycarbonate resin and a phenol resin; 5~15 parts by weight of a melamine-based curing agent; 3~7 parts by weight of one or more selected from among carbon black and carbon nanotubes; 10~20 parts by weight of metal powder; and 1~10 parts by weight of organo clay.

In the present invention, the coating composition may further include remaining solvent in order to adjust the concentration of the coating composition.

In the present invention, remaining solvent may be one or more selected from the group consisting of xylene, toluene, cellosolve, cellosolve acetate, and butyl cellosolve.

The coating composition of the present invention may be applied to form a dry coating film having a thickness of 0.1~100 μm, but the present invention is not limited thereto.

In the coating composition of the present invention, the metal powder may be one or more selected from the group consisting of Al, Cu, Ni, Zn, Fe2P, Fe, Mn, Co, Ti and Sn.

As the organo clay used in the coating composition of the present invention, organo clay (brand name: Cloisite 30B) commercially available from Southern Clay Corp. may be used, or organo clay formed by organizing general clay using a method well known in the related field may be used.

Since a nanocomposite material of a polymer and clay has excellent mechanical properties like a tensile strength, heat resistance, and prevents moistures and gases such as oxygen from infiltrating into the nanocomposite material, research into the nanocomposite material is being conducted on various fronts. Clay is generically referred to as an inorganic compound including silicate having a layered structure. Here, each layer has an irregular disc shape, and has a thickness of about 1 nm and a diameter of about 0.1~100 μm.

In the present invention, the organo clay may be selected from among kaolin, serpentine, mica, vermiculite, smectite, phyllosilicate and combinations thereof. Examples of the smectite may include bentonite, montmorillonite (MMT), saponite, armargosite, metabentonite, hectorite, beidellite, stevensite, halloysite, nontronite, and the like.

The coating composition of the present invention may further include an additive which is commonly added in the preparation of the coating composition, in addition to the above constituents. In this case, it is preferred that the amount of the additive be 1~50 parts by weight based on 100 parts by weight of the resin.

Specifically, examples of the additive may include a quenching agent, wax for providing lubricity, a dispersant for preventing the coagulation of pigment, a defoaming agent, a curing accelerator, and the like.

The present invention can provide an environment-friendly coating composition because harmful chromium (Cr), which is used to improve corrosion resistance, is not used at all. Further, the present invention provides a method of preparing a coating composition having excellent electro-conductivity and corrosion resistance, including the step of: uniformly dispersing using ultrasonic waves one or more base resins selected from the group consisting of a polyester resin, an epoxy resin, a polyurethane resin, an acrylic resin, a polyolefin resin, a fluorine resin, a polycarbonate resin and a phenol resin; a melamine-based curing agent; one or more selected from among carbon black and carbon nanotubes; metal powder; and organo clay.

Preferably, the method of preparing a coating composition according to the present invention may include the step of: uniformly dispersing using ultrasonic waves one or more base resins selected from the group consisting of 100 parts by weight of one or more resins selected from the group consisting of a polyester resin, an epoxy resin, a polyurethane resin, an acrylic resin, a polyolefin resin, a fluorine resin, a polycarbonate resin and a phenol resin; 1~20 parts by weight of a melamine-based curing agent; 1~20 parts by weight of one or more selected from among carbon black and carbon nanotubes; 1~40 parts by weight of metal powder; and 0.001~20 parts by weight of organo clay.

The method of preparing a coating composition according to the present invention may further include the step of: adding remaining solvent to the coating composition.

Preferably, the present invention provides an article having excellent electro-conductivity and corrosion resistance, which is coated with the coating composition. Here, the article may be a steel sheet, but is not limited thereto. The article may be made of metals or other materials in addition to steel.

More preferably, the steel sheet may be a zinc-plated steel sheet, but is not limited thereto. Specific examples of the article may include small-sized or high-integrated electronic parts such as hard disk drives, exterior panels for a PC, LCD cases, PDP cases and the like; small-sized or high-integrated electronic finished products such as mobile phones, PNP (plug and play), electronic navigators, an MP3 (MPEG 1 Layer 3) player, a notebook computer and the like; wood; plastic; ceramic; and the like.

MODE FOR INVENTION

Hereinafter, the present invention will be described in more detail with reference to the following Examples. A better understanding of the present invention may be obtained through the following examples which are set forth to illustrate, but the scope of the present invention is not limited thereto.

Example 1

As shown in Table 1, organo clay, carbon black and aluminum powder were mixed with each of a polyester resin and an epoxy resin, each of which is a base resin, for a predetermined time using a general stirrer, a high-speed mixer or an ultrasonic mixer to form a coating composition, and then the dispersion degree of the coating composition was measured. Dispermat (VMA-GETZMANN, D-51580) was used as the high-speed mixer, and the ultrasonic mixer (VCX750, Sonic & Materials) was used at a power of 300 W. An organized smectite-based layered compound (available from NANOCOR, USA) was used as the organo clay. The carbon black was manufactured by Degussa Corp. and had an average particle size of 2 μm. The aluminum powder had an average particle size of about 3 μm.

The maximum particle size of the coating composition not dispersed was measured using a Hegman particle size meter. In the method of preparing a coating composition using each of the two base resins, the maximum particle size of the coating composition prepared by using the ultrasonic mixer for 10 minutes was 10 μm or under, but the maximum particle sizes of the coating compositions prepared by using the general stirrer or the high-speed mixer were 100 μm and 50 μm, respectively. Therefore, it was found that the coating composition prepared by using the ultrasonic mixer was more effective than the coating composition prepared by using the general stirrer or the high-speed mixer.

TABLE 1

Hegman particle size of coating composition according to method of dispersing clay and aluminum powder

| resin | additive | dispersion method | rpm or power | dispersion time | particle size |
|---|---|---|---|---|---|
| polyester resin (100 parts by weight) | clay (5 parts by weight), carbon black (5 parts by weight), aluminum powder (15 parts by weight) | general stirrer | 1000 rpm | 60 min | 100 um or more |
| | | high-speed mixer | 2000~4000 rpm | 60 min | 50 um or more |
| | | ultrasonic mixer | 300 W | 10 min | 10 um or less |
| epoxy resin (100 parts by weight) | clay (5 parts by weight), carbon black (5 parts by weight), aluminum powder (15 parts by weight) | general stirrer | 1000 rpm | 60 min | 100 um or more |
| | | high-speed mixer | 2000~4000 rpm | 60 min | 50 um or more |
| | | ultrasonic mixer | 300 W | 10 min | 10 um or less |

Example 2

A polyester resin (hereinafter, referred to as "resin A") having a molecular weight of 9,000~10,000 g/mole, which is a base resin, was mixed with a melamine-based curing agent at a weight ratio of 10:1 to form a first mixture, and then carbon black was added to the first mixture and then stirred using a general stirrer at a rotational velocity of 1000 rpm for about 3 minutes to form a second mixture. Subsequently, aluminum powder and organo clay (a smectite-based layered compound available from NANOCOR, USA) were added to the second mixture and then mixed using an ultrasonic mixer for 10 minutes to prepare a coating composition. As shown in Table 2, the coating composition was adjusted to have proper viscosity (Ford cup #4: 60 seconds) using a xylene as remain solvent, and was then bar-coated on one side of a steel sheet having a thickness of 0.5 T and a size of 75×150 μm to form a dry coating film having a thickness of 8 μm. The steel sheet bar-coated with the coating composition was cured in a hot-air drier under the conditions of hot air of a frequency of 20.3 Hz, a peak metal temperature (PMT) of 230° C. and a curing time of 18.1 seconds to prepare steel sheet samples treated with the coating composition.

The steel sheet samples treated with the coating compositions given in Table 2 were evaluated as follows. The surface electric resistance of the steel sheet samples was measured by a 4 point probe method using a LORESTA-GP (MCP-T600) manufactured by Mitsubishi Corp. Further, the corrosion resistance thereof was measured every 120 hours through SST evaluation. The SST evaluation was performed according to ASTM B 117 standards using a saline water spray test apparatus (Q-FOG CCT 1100(Q-PANEL)) under the conditions of 5 wt % of sodium chloride (NaCl) in saline water, a temperature of 35° C. and a relative humidity of 99%.

The corrosion resistance of the steel sheet samples was evaluated by the following standards after a saline water spray test was performed according to the ASTM B 117 standards:

Excellent: white dust did not occur after 120 hours, and white dust occurred within the range of 5% or less of the total area of the steel sheet sample after 240 hours.

Good: white dust occurred within the range of less than 5% of the total area of the steel sheet sample after 120 hours.

68—Insufficient: white dust occurred within the range of 5% or more and less than 50% of the total area of the steel sheet sample after 120 hours.

Poor: white dust occurred within the range of 50% or more of the total area of the steel sheet sample after 120 hours.

The measured surface electric resistance and corrosion resistance of the steel sheet samples are given in Table 2. As given in Table 2, the surface electric resistance of the steel sheet sample coated with a coating composition including no aluminum was 680 Ω/square, but the surface electric resistance of the steel sheet sample coated with a coating composition prepared by adding 7.5 parts by weight of aluminum powder to 100 parts by weight of a polyester base resin (resin A) was 0.91 Ω/square, which was greatly decreased, and the surface electric resistance of the steel sheet sample coated with a coating composition prepared by adding 10 parts by weight of aluminum powder to 100 parts by weight of a polyester base resin (resin A) was about 0.025 Ω/square, which was greatly decreased. However, the surface electric resistance of the steel sheet sample was not decreased any more even when the amount of aluminum powder was increased to 12.5 parts by weight and 15 parts by weight. Like this, according to the results of measuring the corrosion resistance of the steel sheet samples, it can be seen that the corrosion resistance of the steel sheet samples become poor as the amount of aluminum powder was increased.

TABLE 2

Change in surface electric resistance and corrosion resistance of
steel sheet samples according to the addition of aluminum powder

| sample No. | resin A (parts by weight) | additives (phr based on resin solid content) | | | curing agent (parts by weight based on resin solid content) | surface electric resistance (Loresta-GP) (Ω/□) | corrosion resistance (SST) |
|---|---|---|---|---|---|---|---|
| | | carbon black (parts by weight) | clay (parts by weight) | Al powder (parts by weight) | | | |
| 1 | 100 | 5 | — | — | 10 | 680 | good |
| 2 | 100 | 5 | — | 7.5 | 10 | 0.91 | insufficient |
| 3 | 100 | 5 | — | 10 | 10 | 0.025 | insufficient |
| 4 | 100 | 5 | — | 12.5 | 10 | 0.024 | poor |
| 5 | 100 | 5 | — | 15 | 10 | 0.026 | poor |

Example 3

5 parts by weight of carbon black, 15 parts by weight of aluminum powder, 10 parts by weight of a curing agent, and 5 parts by weight of organo clay (smectite) A (brand name: 1.28E, NANOCOR, USA) or B (brand name: 1.33M, NANOCOR, USA) were mixed with a resin A and a resin B (a polyester resin having a molecular weight of 5,000~6,000 g/mol), respectively, to form a mixture, and then the mixture was stirred for about 3 minutes using a general stirrer and then dispersed for about 10 minutes using an ultrasonic mixer to prepare a coating composition. Subsequently, the coating composition was applied on steel sheets and then cured using the same method as in Example 2, and then the surface electric resistance and corrosion resistance of the steel sheets coated with the coating composition were measured, and the results thereof are given in Table 3.

As a result, it can be seen that the surface electric resistance of the steel sheet coated with the coating composition was maintained at a low surface electric resistance of 0.0003~0.02 Ω/square when 5 parts by weight of the organo clay A or B was added, and that the corrosion resistance thereof was improved from poor or insufficient to good or excellent.

Organo clay A and B were respectively dispersed in a resin A, and then analyzed using X-rays. As a result, it can be seen that the interlayer spacing (d-spacing) of the organo clay A was remarkably increased from 2.2 nm to 7.1 nm, and the interlayer spacing (d-spacing) of the organo clay B was remarkably increased from 2.4 nm to 6.0 nm. This means that molecules of the resin A infiltrated between the layers of the organo clay A or B. Therefore, it can be seen that the organo clay A or B was sufficiently dispersed in the resin A. Equally, even when the organo clay A and B were respectively dispersed in a resin B, it can be seen that the interlayer spacing (d-spacing) of the organo clay A was remarkably increased from 2.2 nm to 6.0 nm, and the interlayer spacing (d-spacing) of the organo clay B was remarkably increased from 2.4 nm to 4.2 nm.

TABLE 3

Change in surface electric resistance and corrosion resistance
of steel sheet samples according to the addition of organic clay

| sample No. | resin | resin parts by weight | additives (parts by weight based on resin solid content) | | | curing agent (parts by weight based on resin solid content) | surface electric resistance (Ω/□) | corrosion resistance (SST) |
|---|---|---|---|---|---|---|---|---|
| | | | carbon black (parts by weight) | clay (5 parts by weight) | Al powder (parts by weight) | | | |
| 1 | A | 100 | 5 | — | — | 10 | 680 | good |
| 2 | A | 100 | 5 | — | 15 | 10 | 0.026 | poor |
| 3 | A | 100 | 5 | clay A | 15 | 10 | 0.00043 | good |
| 4 | A | 100 | 5 | clay B | 15 | 10 | 0.0048 | excellent |
| 5 | B | 100 | 5 | — | — | 10 | 350 | good |
| 6 | B | 100 | 5 | — | 15 | 10 | 0.035 | insufficient |
| 7 | B | 100 | 5 | clay A | 15 | 10 | 0.00034 | good |
| 8 | B | 100 | 5 | clay B | 15 | 10 | 0.0033 | excellent |

Example 4

As given in Table 4, carbon black, aluminum powder and a curing agent were mixed with a resin A using the same method as in Examples 3 while the amount of organo clay was changed to 2.5, 5 or 7.5 parts by weight, thus preparing a coating composition. The prepared coating composition was applied on steel sheets and then cured using the same method as in Example 3, and then the surface electric resistance and corrosion resistance of the steel sheets coated with the coating composition were measured. Due to the addition of the organo clay, the surface electric resistance of the steel sheet was not greatly changed, but the corrosion resistance thereof was remarkably improved. Further, when the amount of the organo clay was 2.5~7.5 parts by weight, the surface electric resistance and corrosion resistance of the steel sheets coated with the coating composition were hardly changed.

TABLE 4

Change in surface electric resistance and corrosion resistance of steel sheet samples according to the amount of organic clay B

| sample No. | resin A (parts by weight) | additives (parts by weight based on resin solid content) | | | curing agent (parts by weight based on resin solid content) | surface electric resistance ($\Omega/\square$) | corrosion resistance (SST) |
|---|---|---|---|---|---|---|---|
| | | carbon black (parts by weight) | clay B (parts by weight) | Al powder (parts by weight) | | | |
| 1 | 100 | 5 | — | — | 10 | 680 | good |
| 2 | 100 | 5 | — | 15 | 10 | 0.026 | poor |
| 3 | 100 | 5 | 2.5 | 15 | 10 | 0.00018 | excellent |
| 4 | 100 | 5 | 5 | 15 | 10 | 0.0048 | excellent |
| 5 | 100 | 5 | 7.5 | 15 | 10 | 0.00039 | excellent |

The invention claimed is:

1. A coating composition comprising:
   100 parts by weight of one or more resins selected from the group consisting of a polyester resin, an epoxy resin, a polyurethane resin, an acrylic resin, a polyolefin resin, a fluorine resin, a polycarbonate resin and a phenol resin;
   1~20 parts by weight of a melamine-based curing agent;
   3-7 parts by weight of one or more selected from the group consisting of carbon black and carbon nanotubes;
   10-20 parts by weight of metal powder; and
   2.5-7.5 parts by weight of organo clay.

2. The coating composition according to claim 1, wherein the metal powder comprises one or more selected from the group consisting of Al, Cu, Ni, Zn, Fe, Mn, Co, Ti and Sn.

3. The coating composition according to claim 1, wherein the organo clay comprises one or more selected from the group consisting of kaolin, serpentine, mica, vermiculite, smectite, and phyllosilicate.

4. A method of preparing a coating composition, the method comprising:
   providing a mixture comprising:
      100 parts by weight of one or more resins selected from the group consisting of a polyester resin, an epoxy resin, a polyurethane resin, an acrylic resin, a polyolefin resin, a fluorine resin, a polycarbonate resin and a phenol resin,
      1~20 parts by weight of a melamine-based curing agent,
      3-7 parts by weight of one or more selected from the group consisting of carbon black and carbon nanotube,
      10-20 parts by weight of metal powder, and
      2.5-7.5 parts by weight of organo clay; and
   applying ultrasonic waves to the mixture to disperse its contents.

5. An article comprising:
   a body comprising a surface;
   a coating layer formed on the surface and comprising the coating composition of claim 1.

6. The article according to claim 5, wherein the article is selected from the group consisting of a steel sheet, a hard disk drive, a computer housing, a housing of a liquid crystal display (LCD), a housing of a plasma display panel (PDP), a mobile phone, a PNP (plug and play), an electronic navigator, an MP3 (MPEG 1 Layer 3) player, a wood piece, a plastic piece, and a ceramic piece.

7. The article according to claim 6, wherein the steel sheet is a zinc-plated steel sheet.

* * * * *